United States Patent
Kardos et al.

(10) Patent No.: US 10,508,589 B2
(45) Date of Patent: Dec. 17, 2019

(54) METHOD FOR CONTROLLING A COOLING SYSTEM DELIVERING COOLANT TO HEAT EXCHANGER IN A VEHICLE

(71) Applicant: Scania CV AB, Södertälje (SE)

(72) Inventors: Zoltan Kardos, Södertälje (SE); Ola Hall, Stockholm (SE)

(73) Assignee: SCANIA CV AB (SE)

( * ) Notice: Subject to any disclaimer, the term of this patent is extended or adjusted under 35 U.S.C. 154(b) by 14 days.

(21) Appl. No.: 16/061,357

(22) PCT Filed: Jan. 11, 2017

(86) PCT No.: PCT/SE2017/050023
§ 371 (c)(1),
(2) Date: Jun. 12, 2018

(87) PCT Pub. No.: WO2017/123142
PCT Pub. Date: Jul. 20, 2017

(65) Prior Publication Data
US 2018/0363538 A1    Dec. 20, 2018

(30) Foreign Application Priority Data
Jan. 15, 2016    (SE) ...................................... 1650039

(51) Int. Cl.
*F28D 7/00* (2006.01)
*F28F 27/00* (2006.01)
(Continued)

(52) U.S. Cl.
CPC ................. *F01P 7/167* (2013.01); *F01P 3/20* (2013.01); *B60H 1/00328* (2013.01); *F01P 3/22* (2013.01);
(Continued)

(58) Field of Classification Search
CPC ...... F01P 7/167; F01P 3/22; F01P 7/16; F01P 5/10; F01P 2007/146; F01P 11/16;
(Continued)

(56) References Cited

U.S. PATENT DOCUMENTS

| 2013/0118423 A1 | 5/2013 | Lutz et al. ................. 123/41.08 |
| 2013/0312418 A1 | 11/2013 | Kardos et al. .................. 60/668 |

(Continued)

FOREIGN PATENT DOCUMENTS

| DE | 10 2004 061 428 A1 | 6/2006 |
| DE | 10 2011 085 961 A1 | 5/2013 |

(Continued)

OTHER PUBLICATIONS

Technology Search Report dated Nov. 21, 2014.
(Continued)

*Primary Examiner* — Davis D Hwu
(74) *Attorney, Agent, or Firm* — Ostrolenk Faber LLP

(57) ABSTRACT

A method for controlling a cooling system delivering coolant to a heat exchanger (18) in a vehicle (1). During operating conditions when a thermostat (6) in the cooling system is in the partly open position, the method comprises the steps of estimating a desired cooling temperature (T) of a medium in the heat exchanger (18), calculating the coolant flow rate ($\dot{m}_1$) through a radiator (7b) and the coolant flow rate ($\dot{m}_2$) through a radiator bypass line (9), calculating a coolant flow rate ($\dot{m}_3$) and coolant temperature ($t_3$) combination at 10 at which the medium in the heat exchanger (18) is cooled to a desired temperature (T), adjusting the flow regulating mechanism (23) such that coolant at the selected flow rate ($\dot{m}_3$) and temperature ($t_3$) combination is directed to the heat exchanger (18).

8 Claims, 2 Drawing Sheets

(51) Int. Cl.
*F01P 7/16* (2006.01)
*F01P 3/20* (2006.01)
*F01P 7/14* (2006.01)
*B60H 1/00* (2006.01)
*F01P 3/22* (2006.01)

(52) U.S. Cl.
CPC . *F01P 2003/2292* (2013.01); *F01P 2007/146* (2013.01); *F01P 2025/36* (2013.01)

(58) Field of Classification Search
CPC ...... F01P 7/165; F01P 3/20; F01P 2003/2292; F01P 2025/36; B60H 1/00328; B60H 1/03; B60H 1/00278; B60H 1/00385; B60H 1/00899; B60H 1/0075; B60H 1/00785; B60H 1/00807; B60H 1/3211
USPC ........................................................ 165/200
See application file for complete search history.

(56) References Cited

U.S. PATENT DOCUMENTS

| | | | |
|---|---|---|---|
| 2015/0027387 A1* | 1/2015 | Ohashi | F01P 7/165 123/41.02 |
| 2015/0219002 A1* | 8/2015 | Hayase | F01P 7/165 60/605.3 |
| 2015/0276284 A1 | 10/2015 | Waibel et al. | |
| 2016/0032505 A1* | 2/2016 | Anneaux | D01D 5/0038 442/351 |
| 2016/0159204 A1* | 6/2016 | Katoh | B60H 1/3211 62/185 |
| 2016/0290216 A1* | 10/2016 | Katragadda | F01P 11/16 |

FOREIGN PATENT DOCUMENTS

| | | |
|---|---|---|
| DE | 10 2014 019 684 A1 | 6/2015 |
| EP | 2 554 806 A1 | 2/2013 |
| WO | WO 2016/089276 A1 | 6/2016 |
| WO | WO 2016/089277 A1 | 6/2016 |

OTHER PUBLICATIONS

Notice mailed Sep. 19, 2016 in corresponding Swedish Patent Application No. 1650039-9.
International Search Report dated Apr. 27, 2017 in corresponding PCT International Application No. PCT/SE2017/050023.
Written Opinion dated Apr. 27, 2017 in corresponding PCT International Application No. PCT/SE2017/050023.

* cited by examiner

METHOD FOR CONTROLLING A COOLING SYSTEM DELIVERING COOLANT TO HEAT EXCHANGER IN A VEHICLE

CROSS-REFERENCE TO RELATED APPLICATIONS

The present application is a 35 U.S.C. §§ 371 national phase conversion of PCT/SE2017/050023, filed Jan. 11, 2017, which claims priority of Swedish Patent Application No. 1650039-9, filed Jan. 15, 2016, the contents of which are incorporated by reference herein. The PCT International Application was published in the English language.

TECHNICAL FIELD

The present invention relates to a method for controlling a cooling system delivering coolant to a heat exchanger in a vehicle.

BACKGROUND OF THE INVENTION AND PRIOR ART

The cooling system which cools a combustion engine in a vehicle is also many times used to cool various mediums of different systems of the vehicle. The coolant of the coolant system can be used to cool the working medium of an AC system in a condenser, charge air in a charge air cooler, recirculating exhaust gases in an exhaust cooler and the working medium of a WHR system in a condenser.

In order to achieve a high thermal efficiency of a WHR-system, the working medium is to be cooled in the condenser by the coolant to a condensation temperature that is as low as possible and substantially without subcooling. Thus, the working medium is to be cooled with a cooling effect of a specific value. However, heating of the working medium in an evaporator of the WHR system varies during different operating conditions and especially when the WHR system absorbs heat energy from the exhaust gases of a combustion engine. The required cooling of the working medium in the condenser varies in a corresponding manner. It is difficult to control a cooling system such that it provides a rapidly adjustable cooling of the working medium in the condenser and especially a rapidly adjustable cooling of the working medium at which a substantially continuous condensation temperature is maintained in the condenser at which the WHR system receives a high thermal efficiency.

US 2013/0118423 shows a cooling circuit with a circulating coolant which cools a motor. The cooling circuit comprises a cooling line where the coolant cools a working medium in a condenser of a WHR-system and a bypass line leading the medium past the condenser. The coolant flow through the bypass line is controlled by a relief valve which opens at a specific pressure.

SUMMARY OF THE INVENTION

The object of the present invention is to provide a method for controlling a cooling system such that it delivers coolant at an adjustable flow rate and a temperature to a heat exchanger in order to substantially continuously cool a medium in the heat exchanger to a desired temperature.

The above mentioned object is achieved by the method herein which comprises the initial steps of estimating a desired cooling temperature of the medium in the heat exchanger and the required cooling effect for cooling the medium to the desired temperature. When a thermostat is partly open, it directs a first coolant flow rate to a radiator line and a second coolant flow rate to a radiator bypass line. The first coolant flow rate is at a first temperature when it leaves the radiator and the second coolant flow rate is at a second temperature. When the thermostat is partly open, it is possible to direct a suitable mixture of the first coolant flow rate at the first temperature and the second coolant flow rate at the second temperature to the heat exchanger for cooling the medium to the desired temperature. The first temperature and the second temperature of the coolant can be measured by temperature sensors. However, it is complicated and expensive to install flow meters which measure the first coolant flow rate and the second coolant flow rate with high accuracy. To avoid installation of a flow meter, the cooling effect in the radiator is estimated whereupon the first coolant flow rate through the radiator is calculated. In this case, it is possible to estimate the first coolant flow rate through the radiator with high accuracy, in a simple manner and at a low cost. The second coolant flow rate can be calculated as the difference between the total coolant flow rate and the first coolant flow rate. The total coolant flow rate in the cooling system can be estimated based on information about performance data of a pump providing the total coolant flow rate in the cooling system.

When the first coolant flow rate, the second coolant flow rate and the temperatures of the coolant flow rates have been estimated, it is possible to calculate a coolant flow rate and a temperature combination which cools the medium in the heat exchanger to the desired temperature. The final step comprises adjusting the flow regulating mechanism such that coolant at this flow rate and temperature combination is directed to the heat exchanger. Thereafter, the method starts again at the above mentioned initial steps. The method can be performed with a relatively high frequency such that coolant at a suitable flow rate and temperature combination always is delivered to the heat exchanger resulting in substantially continuous cooling of the medium in the heat exchanger to the desired temperature. The cooling system which cools the medium in the heat exchanger may be the same cooling system which cools a combustion engine in the vehicle.

According to an embodiment of the invention, the method comprises the steps of calculating several coolant flow rate and temperature combinations at which the medium in the heat exchanger is cooled to the desired temperature and selecting one of those combinations. Usually it is possible to calculate several coolant flow rate and temperature combinations at which the medium in the heat exchanger is cooled to the desired temperature. In this case, it is possible to select the most favorable combination. However, the coolant flow rate to the heat exchanger must not be too small.

According to an embodiment of the invention, the method comprises the steps of estimating the cooling effect in the radiator based on information about the cooling air flow through the radiator and performance data of the radiator at varying air flows. The cooling capacity of a radiators is usually well documented during different operating conditions. In view of information as to the actual air flow through the radiator and the air temperature, it is possible to estimate the cooling effect in the radiator. The actual air flow through the radiator is estimated by means of the velocity of the vehicle and the speed of a radiator fan forcing air through the radiator.

According to an embodiment of the invention, the method comprises the steps of calculating the coolant flow rate through the radiator line by information as to the cooling effect of the coolant in the radiator, the temperature drop of the coolant in the radiator and the specific heat capacity of the coolant. The coolant flow rate can be calculated according to the formula $Q = \dot{m} \cdot cp \cdot \Delta t$ where the coolant flow rate m is the only unknown parameter.

According to an embodiment of the invention, during operating conditions when the thermostat is in the closed position, the method comprises the steps of estimating a desired cooling temperature of the medium in the heat exchanger, calculating a required coolant flow rate at the coolant temperature to be directed to the heat exchanger at which the medium receives the desired temperature and adjusting the flow regulating mechanism such that the calculated coolant flow rate is directed to the heat exchanger. In this case, the thermostat directs the entire coolant flow rate to the radiator bypass line. The entire coolant flow rate and the coolant temperature are known. In this case, it is relatively uncomplicated to calculate the proportion of the entire coolant flow rate to be directed to the heat exchanger for cooling the medium to the desired temperature.

According to an embodiment of the invention, during operating conditions when the thermostat is in the fully open position, the method comprises the steps of estimating a desired cooling temperature of the medium in the heat exchanger, calculating a required coolant flow at the coolant temperature to be directed to the heat exchanger at which the medium receives the desired temperature, adjusting the flow regulating mechanism such that the calculated coolant flow rate is directed to the heat exchanger. In this case, the thermostat directs the entire coolant flow rate to the radiator line. The entire coolant flow rate and the coolant temperature are known. In this case, it is also relatively uncomplicated to calculate the proportion of the entire coolant flow rate to be directed to the heat exchanger for cooling the medium to the desired temperature.

According to an embodiment of the invention, the method comprises the steps of receiving information as to the actual temperature of the medium in the heat exchanger, comparing the actual temperature with the desired temperature and adjusting the valve in order to eliminate a possible difference between the desired temperature and the actual temperature of the medium in the heat exchanger. By means of such a feedback, it is possible to adjust the coolant flow rate to the heat exchanger in order to eliminate a possible difference between the actual cooling temperature and the desired cooling temperature of the medium in the heat exchanger.

According to an embodiment of the invention, the method comprises the step of adjusting the coolant flow to the heat exchanger line by the valve in a stepless manner. In this case, it is possible to regulate the coolant flow rate directed to the heat exchanger with a high accuracy.

According to an embodiment of the invention, the method comprises the step of delivering coolant at a variable flow rate and temperature to a condenser in which the condenser cools a working medium of a WHR system to a specific condensation temperature. In order to continuously maintain a high thermal efficiency in a WHR-system, it is necessary to adjust the cooling effect of the working medium in the condenser during different operating conditions. Alternatively, the coolant is used to cool a working medium in a condenser of an AC system, charge air in charge air cooler or recirculating exhaust gases in an exhaust gas cooler.

According to an embodiment of the invention, the method comprises the step of regulating the coolant flow rate to the heat exchanger by a flow regulating mechanism, adjusting the flow resistance in the heat exchanger bypass line and/or the heat exchanger line. In this case, the flow regulating mechanism may comprise one or several adjustable throttle valves arranged in the heat exchanger bypass line and/or in the heat exchanger line.

BRIEF DESCRIPTION OF THE DRAWINGS

In the following a preferred embodiment of the invention is described, as an example, with reference to the attached drawing, in which.

DESCRIPTION OF A PREFERRED EMBODIMENT OF THE INVENTION

Figure 1:
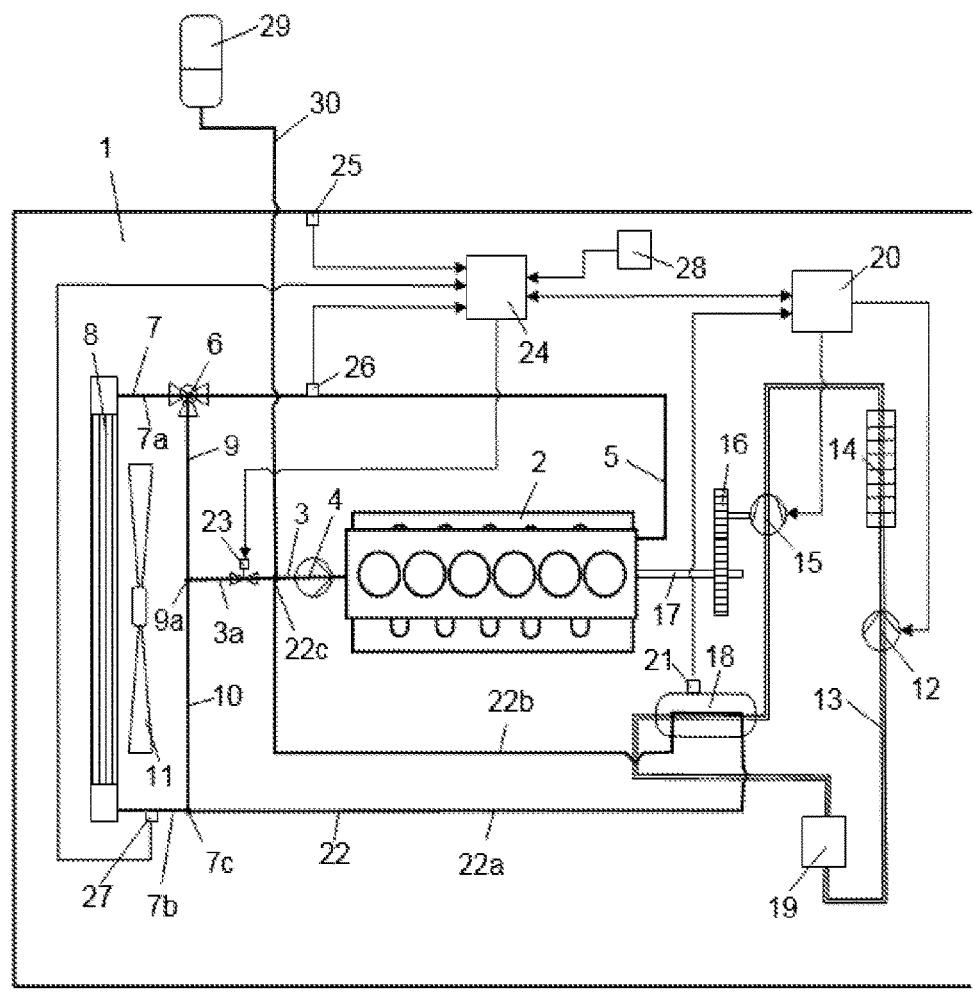
FIG. 1 shows a cooling system cooling a working medium in a condenser of a WHR system and FIG. 2 shows a flowchart describing an embodiment of a method according to the invention.

FIG. 1 shows a combustion engine 2 powering a schematically disclosed vehicle 1. The combustion engine 2 may be a diesel engine. The vehicle 1 may be a heavy vehicle. The vehicle 1 comprises a cooling system comprising an engine inlet line 3 provided with a pump 4 circulating a coolant in the cooling system. The pump 4 provides a coolant flow rate to through the combustion engine 2. When the coolant has circulated through the combustion engine 2, it is received in an engine outlet line 5. A thermostat 6 is arranged at an end of the engine outlet line 5. The thermostat 6 receives a coolant flow rate m at a temperature $t_2$. The cooling system comprises a radiator line 7 directing coolant through a radiator 8. The radiator line 7 comprises a radiator inlet line 7a, and a radiator outlet line 7b. The cooling system comprises a radiator bypass line 9 directing coolant past the radiator 8. The radiator bypass line 9 and the radiator outlet line 7b are connected to each other via a connection line 10. The connection line 10 is connected to the radiator bypass line 9 via a first connection point 9a and to the radiator outlet line 7b via a second connection point 7c.

The thermostat 6 is closed when the coolant temperature $t_2$ is lower than a regulating temperature of the thermostat 6. In the closed position, the thermostat 6 directs the entire coolant flow rate m to the radiator bypass line 9. The thermostat 6 is partly open when the coolant temperature $t_2$ is within a somewhat higher temperature range than the regulating temperature. In the partly open position, the thermostat 6 directs a first part $\dot{m}_1$ of the coolant flow rate to the radiator line 7 and a second part $\dot{m}_2$ of the coolant flow rate to the radiator bypass line 9. In case the coolant has a higher temperature than the highest temperature of the temperature range at which the thermostat 6 is partly open, the thermostat 6 is fully open. In the fully open position, the thermostat 6 directs the entire coolant flow rate m to the radiator line 7. The ram air and a radiator fan 11 provide a cooling air flow through the radiator 8. The coolant is cooled to a temperature $t_1$ in the radiator 8.

The vehicle is provided with a WHR-system (Waste Heat Recovery system). The WHR-system comprises a pump 12 which pressurizes and circulates a working medium in a closed a circuit 13. In this case, the working medium is ethanol. However, it is possible to use other kinds of working mediums, such as R245fa. The pump 12 pressurizes and circulates the working medium to an evaporator 14. The working medium is heated in the evaporator 14, for example, by exhaust gases from the combustion engine. The working medium is heated in the evaporator 14 to a temperature at which it evaporates. The working medium is circulated from the evaporator 14 to the expander 15.

The pressurised and heated working medium expands in the expander 15. The expander 15 generates a rotary motion which may be transmitted, via a suitable mechanical transmission 16, to a shaft 17 of the power train of the vehicle 1. Alternatively, the expander 15 may be connected to a generator transforming mechanical energy into electrical energy. The electrical energy may be stored in a battery. After the working medium has passed through the expander 15, it is directed to a condenser 18. The working medium is cooled in the condenser 18 by coolant from the cooling system to a temperature at which it condenses. The working medium is directed from the condenser 18 to a receiver 19. The pump 12 sucks working medium from the bottom of the receiver 19 ensuring that only working medium in a liquid state is supplied to the pump 12. A first control unit 20 controls the operation of the WHR-system. The first control unit 20 controls the operation of the pump 12 and the expander 15. The WHR-system makes it possible to transform thermal energy from the exhaust gases to mechanical energy or electrical energy.

The temperature of exhaust gases and thus the heating effect of the working medium in the evaporator 14 varies during different operation conditions. In order to maintain a substantially continuously high thermal efficiency in the WHR-system, the working medium in the condenser 18 is to be cooled with an adjustable cooling effect. It is favorable to establish a condensation pressure as low as possible at the different operating conditions. However, it is suitable to avoid negative pressure in the WHR-system for practical reasons. In view of these facts, it is suitable to provide cooling of the working medium in the condenser 18 to a condensation pressure just above 1 bar. Consequently, in order to maintain a high thermal efficiency, it is necessary to adjust the cooling effect of the working medium in the condenser 18 in view of the supplied heat energy from the exhaust gases such that the condensation pressure will be just above 1 bar. The working medium ethanol has a condensation temperature of 78° C. at 1 bar. In this case, it is suitable to accomplish a condensation temperature of just above 78° C. in the condenser 18.

The cooling system comprises a condenser line 22 directing coolant through the condenser 18. The condenser line 22 comprises a condenser inlet line 22a directing coolant to the condenser 18. The condenser inlet line 22a receives coolant from the radiator outlet line 7b and/or the connection line 10 via the second connection point 7c. The condenser line 22 comprises a condenser outlet line 22b directing coolant from the condenser 18 to a third connection point 22c with the engine inlet line 3. The third connection point is arranged in a position downstream of a valve 23 arranged in the engine inlet line 3 and upstream of the pump 4. The part of the engine inlet line 3 which is arranged between the first connection point 9a and the third connection point 22c defines a condenser bypass line 3a. The valve 23 provides an adjustable flow resistance in a stepless manner for the coolant in the condenser bypass line 3a. The condenser line 22 provides a constant flow resistance for the coolant. By means of the valve 23, which may be a throttle vale, it is possible adjust the flow resistances in the condenser bypass line 3a in relation to the constant flow resistance in the condenser line 22 and thus an adjustable coolant flow rate $\dot{m}_4$ through the condenser bypass line 3a in relation to a coolant flow rate $\dot{m}_b$ through the condenser line 22.

A second control unit 24 controls the valve 23. A first temperature sensor 25 measures the ambient temperature. A second temperature sensor 26 measures the temperature $t_2$ of the coolant in the engine outlet line 5. A third temperature sensor 27 measures the temperature $t_1$ of the coolant in the radiator outlet line 7b. The second control unit 24 receives substantially continuous information from the temperature sensors 25-27 about actual temperatures. The second control unit 24 also receives information from the first control unit 20 about the operating condition of the WHR system. Furthermore, the second control unit 24 receives information about operation parameters 28 of the vehicle, such as vehicle speed and the speed of the radiator fan 11. The second control unit 24 has access to stored information about performance data of the radiator 8 at varying air flows. An expansion tank 29 is connected to the engine inlet line 3 in a position downstream of the valve 23 and upstream of the pump 4 via a static line 30. A temperature sensor 21 or a pressure sensor measures the condensation temperature or the condensation pressure in the condenser 18.

Figure 2:
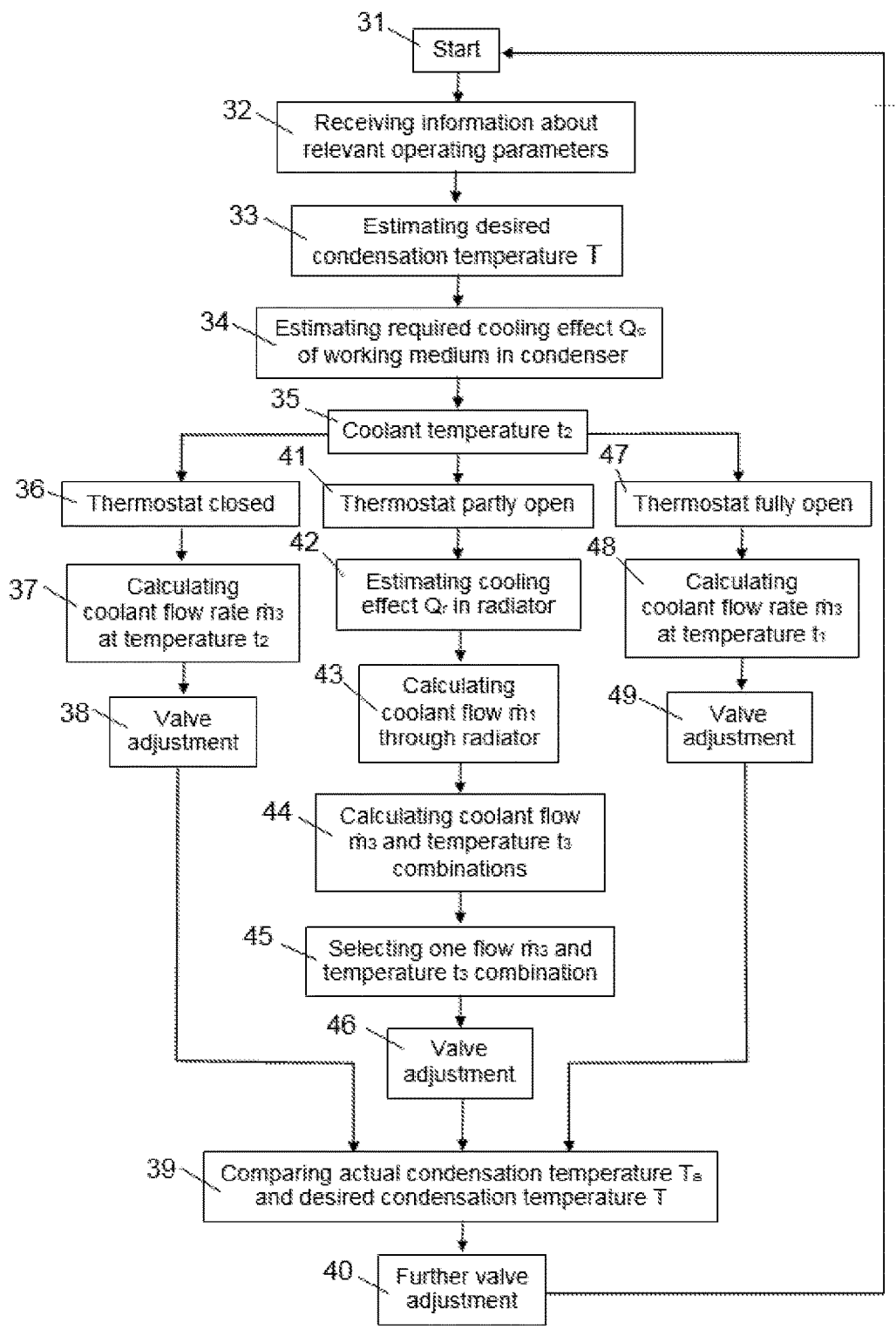

FIG. 2 shows a flowchart describing a method for directing coolant at a variable flow rate $\dot{m}_b$ and at a variable temperature $t_3$ to the condenser 18. The method starts at step 31. At step 32, the control unit 24 receives information about relevant operating parameters of the vehicle 1. The operating parameters include the velocity of the vehicle 1 and the speed of the radiator fan 10. The operating parameters may include engine load and temperature of the exhaust gases. The control unit 24 also receives information about relevant operating parameters of the WHR system. The control unit 24 receives, for example, information from the temperature sensor 21 about the actual condensation temperature $T_a$ in the condenser 18. At step 33, the control unit 24 estimates a desired condensation temperature of the working medium in the condenser 18. When ethanol is used as working medium, a condensation temperature of about 80° C. is desirable during most operating conditions. The control unit 24 estimates, at step 34, the required cooling effect $Q_c$ of the working medium in the condenser 18 at which the working medium receives the desired condensation temperature T.

At step 35, the control unit 24 receives information about the coolant temperature $t_2$ in the engine outlet line 5. At operating conditions when the coolant temperature $t_2$ in the engine outlet line 5 is lower than the regulating temperature of the thermostat 6, the method continues at step 36. The control unit 24 notes that the thermostat 6 is in a closed position and it directs the entire coolant flow rate m at the temperature $t_2$ to the radiator bypass line 9. In this case, the control unit 24 has information about the temperature $t_2$ of the coolant directed to the condenser 18 and the required cooling effect $Q_c$ in the condenser. Furthermore, the control unit 24 has access to necessary parameters such as the heat capacity of the coolant and the working medium, and performance data of the condenser 18. In view of this fact, it is possible for the control unit 24, at step 37, to calculate the required coolant flow rate $\dot{m}_3$ at the temperature $t_2$ to be directed to the condenser 18 in order to cool the working medium in the condenser 18 with the estimated cooling effect $Q_c$ at which the working medium condenses at the desired condensation temperature T.

At step 38, the control unit 24 regulates the valve 23 such that it provides a flow resistance in the heat exchanger bypass line 3a at which the coolant flow rate $\dot{m}$ in the radiator bypass line 9 is divided in a coolant flow rate $\dot{m}_3$ through the heat exchanger line 22 and a remaining coolant flow rate $\dot{m}_t$ through the heat exchanger bypass line 3a. The remaining coolant flow rate $\dot{m}_4$ can be calculated as $\dot{m}-\dot{m}_3$. At step 39, the control unit 24 receives information from the temperature sensor 21 about the actual condensation temperature $T_a$. The control unit 24 compares, at step 39, the actual condensation temperature $T_a$ with the desired condensation temperature T. In case there is a difference between the actual condensation temperature $T_a$ and the desired condensation temperature T, the control unit 24 provides, at step 39, a further valve adjustment in order to eliminate such a possible difference. Thereafter, the method restarts at step 31.

If instead, at step 35, the coolant temperature $t_2$ in the engine outlet line 5 is within the temperature range where the thermostat 6 is partly open, the method continues at step 41. In this case, the thermostat 6 directs a first coolant flow rate $\dot{m}_1$ to the radiator line 7 and a second coolant flow rate $\dot{m}_2$ to the radiator bypass line 9. The first coolant flow rate $\dot{m}_1$ is cooled to the temperature $t_1$ in the radiator 8. At step 42, the control unit 24 estimates the cooling effect $Q_r$ in the radiator 8 by means of performance data of the radiator 8 at varying air flows and air temperatures. The air flow through the radiator 8 is estimated by means of information of the velocity of vehicle 1 and the speed of the radiator fan 10. The control unit 24 receives information from the temperature sensor 25 about the temperature of the ambient air. At step 43, the control unit 42 calculates the coolant flow rate $\dot{m}_1$ through the radiator 8 according to the formula $Q_r = \dot{m}_1 \cdot c_p \cdot (t_2 - t_1)$. The cooling effect $Q_r$ in the radiator has been estimated above, $c_p$ is the heat capacity of the coolant, $t_2$ is received from the temperature sensor 27 and $t_1$ is received from the temperature sensor 27. Thus, the coolant flow rate $\dot{m}_1$ through the radiator 8 is calculable since it is the only unknown parameter in the formula. The coolant flow rate $\dot{m}_2$ through the radiator bypass line 9 can be calculated as $\dot{m}_b = \dot{m} - \dot{m}_1$, where it is the total coolant flow rate in the cooling system which is defined by the pump 4.

The control unit 24 now has information about the coolant flow rate $\dot{m}_1$ and the coolant temperature $t_1$ in the radiator line 7 and information about the coolant flow rate $\dot{m}_2$ and the coolant temperature $t_2$ in the radiator bypass line 9. In this case, the entire coolant flow rate $\dot{m}_1$ at the temperature $t_1$ from the radiator line 7 is directed to the heat exchanger line 22 and the condenser 18. However, it is possible to introduce a variable amount of the coolant flow rate $\dot{m}_2$ at the temperature $t_2$ in the heat exchanger line 22 by means of the valve 23. At step 44, the control unit 24 calculates possible coolant flow rate $\dot{m}_3$ and temperature $t_3$ combinations which provide the required cooling effect $Q_c$ in the condenser at which the working medium is condensed at the desired condensation temperature T. During some operating conditions the number of such combinations can be relatively large. Combinations with a too small coolant flow rate $\dot{m}_3$ to the condenser 18 can be excluded. The control unit 24 selects, at step 45, the most favorable combination of coolant flow rate $\dot{m}_3$ and coolant temperature $t_3$ to be directed to the condenser 18. The control unit 24 performs, at step 46, an adjustment of the valve 23 and the flow resistance in the heat exchanger bypass line 3a in order to direct coolant with the selected combination of flow rate $\dot{m}_3$ and temperature $t_3$ to the heat exchanger line 22 and the condenser 18.

The control unit 24 receives information from the temperature sensor 21 about the actual condensation temperature in the condenser 18. At step 39, the control unit 24 compares the actual condensation temperature $T_a$ with the desired condensation temperature T. If there is a difference between the actual condensation temperature $T_a$ and the desired condensation temperature T, the control unit 24 performs a further adjustment of the valve 23, at step 40, in order to eliminate such a possible difference. Thereafter, the method restarts at step 31.

If instead, at step 35, the coolant temperature $t_2$ in the engine outlet line 5 is higher than the highest temperature in the temperature range in which the thermostat 6 is partly open, the method continues at step 47. The thermostat 6 is fully open and it directs the entire coolant flow rate m from the engine outlet line 5 to the radiator line 7 and the radiator 8. At step 48, the control unit 24 calculates the required coolant flow rate $\dot{m}_3$ at the temperature $t_1$ to be directed to the condenser 18 in order to cool the working medium in the condenser 18 with the estimated cooling effect Q at which the working medium condenses at the desired condensation temperature T. In this case, the control unit 24 receives information about the coolant temperature $t_1$ from the temperature sensor 27. Furthermore, the control unit 24 has access to necessary parameters such as the heat capacity $c_p$ of the coolant and the working medium and performance data of the condenser 18. In view of this fact, it is possible for the control unit 24 to calculate the required coolant flow rate $\dot{m}_3$ at the temperature $t_1$ to be directed to the condenser 18.

At step 49, the control unit 24 regulates the valve 23 such that it provides a flow resistance in the heat exchanger bypass line 3a at which the coolant flow rate $\dot{m}$ in the radiator line 7 is divided in a coolant flow rate $\dot{m}_3$ through the heat exchanger line 22 and a remaining coolant flow rate $\dot{m}_4$ through the heat exchanger bypass line 3a. At step 39, the control unit 24 receives information from the temperature sensor 21 about the actual condensation temperature $T_a$. The control unit 24 compares, at step 39, the actual condensation temperature $T_a$ and the desired condensation temperature T. In case there is a difference between the desired condensation temperature T and the actual condensation temperature $T_a$, the control unit 24 provides, at step 39, a further valve adjustment in order to eliminate such a possible difference. Thereafter, the method restarts at step 31.

The invention is not restricted to the described embodiment but may be varied freely within the scope of the claims. It is, for example, possible to use other kind of a flow regulating mechanisms than a single adjustable valve 23 arranged in the radiator bypass line 3a. Furthermore, it is possible to cool other mediums in a heat exchanger than a working medium in a condenser 18. It is, for example, possible to cool charged air in a charged air cooler, recirculating exhaust gases in an exhaust gas cooler, an a working medium of a AC system in a condenser.

The invention claimed is:
1. A method for controlling a cooling system delivering coolant to a heat exchanger in a vehicle, wherein
the cooling system comprises:
a radiator line configured to direct coolant to a radiator in which the coolant is cooled to a first temperature;
a radiator bypass line directing coolant past the radiator;
a heat exchanger line receiving coolant from the radiator line and from the radiator bypass line and directing the coolant to a heat exchanger;
a heat exchanger bypass line receiving coolant from the radiator line and the radiator bypass line and directing the coolant past the heat exchanger;
a thermostat receiving a coolant flow range ($\dot{m}$) at a second temperature, wherein the thermostat in a closed position directs the entire coolant flow range ($\dot{m}$) to the radiator bypass line, in a partly open position directs a first coolant flow range ($\dot{m}_1$) to the radiator line and a second coolant flow range ($\dot{m}_2$) to the radiator bypass line, and in a fully open position directs the entire coolant flow rate ($\dot{m}$) to the radiator line; and a flow regulating mechanism directing coolant from the radiator line and the radiator bypass line to the heat exchanger line and/or the heat exchanger bypass line, wherein;

during operating conditions when the thermostat is in the partly open position, the method comprises the steps of:

estimating a desired cooling temperature of a medium in the heat exchanger, estimating a cooling effect of the coolant in the radiator from information about the cooling air flow through the radiator and from performance data of the radiator at varying air flows, calculating the coolant flow rate ($\dot{m}_1$) through the radiator line from information of the cooling effect of the coolant in the radiator, temperature drop ($t_1$-$t_2$) of the coolant in the radiator and the specific heat capacity ($c_p$) of the coolant, calculating the coolant flow rate ($\dot{m}_2$) through the radiator bypass line;

calculating a coolant flow rate ($\dot{m}_3$) and coolant temperature combination at which the medium in the heat exchanger is cooled to the desired temperature; and adjusting the flow regulating mechanism such that coolant at the selected flow rate ($\dot{m}_b$) and temperature combination is directed to the heat exchanger line and the heat exchanger.

2. A method according to claim 1, comprising the steps of calculating several coolant flow rate ($\dot{m}_3$) and coolant temperature ($t_3$) combinations at which the medium in the heat exchanger is cooled to the desired temperature (T) and selecting one of the combinations.

3. A method according to claim 1, wherein during operating conditions when the thermostat is in the closed position, the method comprises the steps of:

estimating a desired cooling temperature of the medium in the heat exchanger;

calculating a required coolant flow rate ($\dot{m}_3$) at the second temperature to be directed to the heat exchanger at which the medium receives the desired temperature; and adjusting the flow regulating mechanism such that the calculated coolant flow ($\dot{m}_3$) is directed to the heat exchanger.

4. A method according to claim 1, wherein during operating conditions when the thermostat is in the fully open position, the method comprises the steps of estimating a desired cooling temperature of the medium in the heat exchanger;

calculating a required coolant flow ($\dot{m}_3$) at the first temperature to be directed to the heat exchanger at which the medium receives the desired temperature; and adjusting the flow regulating mechanism such that the calculated coolant flow ($\dot{m}_3$) is directed to the heat exchanger.

5. A method according to claim 1, comprising the steps of:

receiving information of the actual cooling temperature of the medium in the heat exchanger;

comparing the actual temperature with the desired temperature; and adjusting the flow regulating mechanism in order to eliminate a possible difference between the desired temperature and the actual temperature of the medium in the heat exchanger.

6. A method according to claim 1, comprising the step of:

adjusting the coolant flow ($\dot{m}_3$) to the heat exchanger line in a stepless manner.

7. A method according to claim 1, comprising the step of:

regulating the coolant flow rate ($\dot{m}_3$) to the heat exchanger by adjusting the flow resistance in the heat exchanger bypass line by the flow regulating mechanism.

8. A method according to claim 1, comprising the step of:

delivering coolant at a variable flow rate ($\dot{m}_b$) and a variable temperature to a condenser in which it cools a working medium of a WHR system to a specific condensation temperature.

* * * * *